US011816468B2

(12) United States Patent
Faletti et al.

(10) Patent No.: US 11,816,468 B2
(45) Date of Patent: *Nov. 14, 2023

(54) DUAL-CORE ATM

(71) Applicant: Capital One Services, LLC, McLean, VA (US)

(72) Inventors: Stephen van Beek Faletti, Brooklyn, NY (US); Charleston Malkemus, McLean, VA (US); David Kelly Wurmfeld, Falls Church, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/340,960

(22) Filed: Jun. 7, 2021

(65) Prior Publication Data

US 2021/0365259 A1    Nov. 25, 2021

Related U.S. Application Data

(63) Continuation of application No. 16/735,248, filed on Jan. 6, 2020, now Pat. No. 11,029,939.

(51) Int. Cl.
*G06F 8/65* (2018.01)
*G06F 13/40* (2006.01)
*G06Q 20/10* (2012.01)

(52) U.S. Cl.
CPC ............ *G06F 8/65* (2013.01); *G06F 13/4022* (2013.01); *G06Q 20/1085* (2013.01)

(58) Field of Classification Search
CPC .... G06Q 20/1085; G06F 8/65; G06F 13/4022
See application file for complete search history.

(56) References Cited

U.S. PATENT DOCUMENTS 6,532,547 B1 * 3/2003 Wilcox .............. G06F 11/2089
710/72
8,162,124 B2    4/2012 Tabachnik
(Continued)

FOREIGN PATENT DOCUMENTS

WO    2018007828 A2    1/2018

OTHER PUBLICATIONS

Silviu S. Craciunas et al., "Programmable Temporal Isolation in RealTime and Embedded Execution Environments", 2009, pp. 19-24, <dl.acm.org/doi/pdf/10.1145/1519130.1519134>. Retrieved from Internet on Jan. 16, 2021.
(Continued)

*Primary Examiner* — Ziaul A Chowdhury
(74) *Attorney, Agent, or Firm* — Sterne, Kessler, Goldstein & Fox P.L.L.C.

(57) ABSTRACT

Disclosed herein are system, method, and computer program product embodiments a dual-core automated teller machine (ATM). The dual core ATM system and method includes two physical central processing units ("computing devices" or "cores") that are configured to perform operations in coordination with peripheral devices. Peripheral devices of the dual-core ATM system can include a peripheral screen, such as a touch screen, a card reader, a PIN pad (e.g., an encrypted pin pad or "EPP"), a cash dispenser, and a cash deposit module. A peripheral switch can isolate one of the computing devices from the one or more peripheral devices and that can permit the other of the computing devices to control the one or more peripheral devices. By maintaining redundant hardware sets within the ATM enclosure, the system can avoid a necessary reboot or powering-off in the event of, for example, a software failure.

18 Claims, 9 Drawing Sheets

(56) References Cited

U.S. PATENT DOCUMENTS

| | | | |
|---|---|---|---|
| 8,549,512 | B1 | 10/2013 | Vannatter et al. |
| 8,689,039 | B1 | 4/2014 | Munson et al. |
| 9,250,923 | B2 | 2/2016 | Kobres |
| 9,389,967 | B2 | 7/2016 | Dent |
| 9,679,457 | B1 | 6/2017 | Welsh |
| 2003/0120772 | A1 | 6/2003 | Husain et al. |
| 2004/0236874 | A1 | 11/2004 | Largman et al. |
| 2008/0091861 | A1* | 4/2008 | Jones ............... G06F 3/0674 710/106 |
| 2010/0113144 | A1* | 5/2010 | Hayes ............... G07F 17/3202 463/29 |
| 2010/0198708 | A1 | 8/2010 | Tabachnik |
| 2012/0086545 | A1 | 4/2012 | Von Der Lippe et al. |
| 2013/0024721 | A1 | 1/2013 | Kabulepa et al. |
| 2013/0340069 | A1 | 12/2013 | Yoffe et al. |
| 2014/0289433 | A1 | 9/2014 | Soffer et al. |
| 2015/0095130 | A1 | 4/2015 | Benjamin et al. |
| 2015/0379489 | A1 | 12/2015 | Gopalakrishnan et al. |
| 2016/0092693 | A1 | 3/2016 | Gharabally |
| 2016/0257528 | A1 | 9/2016 | Kirchhoff et al. |
| 2016/0364729 | A1 | 12/2016 | Ruparelia et al. |
| 2016/0378443 | A1 | 12/2016 | Sun et al. |
| 2017/0090948 | A1* | 3/2017 | Waidhofer ........ G06F 13/4282 |
| 2018/0341310 | A1* | 11/2018 | Lambert ............ G06F 13/4282 |
| 2020/0110372 | A1 | 4/2020 | Paffen et al. |

OTHER PUBLICATIONS

Doris Hausen, "Peripheral Interaction: Facilitating Interaction with Secondary Tasks", 2012, pp. 387-388, <https://dl.acm.org/doi/pdf/10.1145/2148131.2148227> . Retrieved from Internet on Jan. 16, 2021.

Kazuhiro Mishima et al., Secure Campus Network System with Automatic Isolation of High Security Risk Device], 2018, pp. 107-110, <https://dl.acm.org/doi/pdf/10.1145/3235715.3235738>. Retrieved from Internet on Jan. 16, 2021.

Marna van der Maas et al., "Protecting Enclaves from Intra-Core Side-Channel Attacks through Physical Isolation", 2020, pp. 1-12, <https://dl.acm.org/doi/pdf/10.1145/3411505.3418437>. Retrieved from Internet on Jan. 16, 2021.

U.S. Appl. No. 16/735,248, "Dual-Core ATM", to Stephen Van Beek Faletti, filed Jan. 6, 2020, pp. 1-60.

* cited by examiner

Choose Amount

Get cash from:
Checking Account ...0987
$11,435.12 Available

Amount:
$20

Choose Amount  Done $20
$40
$60

FIG. 3D

Confirm Details

Get cash from:
Checking Account ...0987
$11,435.12 Available

Amount:
$60

Confirm Details

DUAL-CORE ATM

CROSS-REFERENCE TO RELATED APPLICATION

This application is a continuation of U.S. patent application Ser. No. 16/735,248, titled "Dual Core ATM" to Faletti et al., filed on Jan. 6, 2020, which is herein incorporated by reference in its entirety.

BACKGROUND

An automated teller machine (ATM) is an electronic device that allows banking customers to carry out financial transactions without the need for a human teller. For example, customers may use an ATM to access their bank accounts, transfer funds, check account balances, or dispense items of value. Generally, to use an ATM, the customer may insert a banking card containing magnetic strip information into the ATM's card reader, and authenticate the card by entering a personal identification number (PIN). After the card has been read and authenticated, the customer can carry out various financial transactions. Increasingly, banking has moved to apps on mobile devices. From a mobile app, users can perform many different types of banking transactions, such as checking balances and performing fund transfers between accounts. However, occasionally even users of mobile apps for banking must conduct transactions at an Automated Teller Machine (ATM) that cannot be completed on the mobile app, such as performing a cash withdrawal.

ATM software failures are often catastrophic, forcing a machine reboot, which can take 30 minutes or more to complete. During this time, that machine is rendered unusable. Likewise, when an ATM requires a hardware replacement or software upgrade, it can take days to several hours or days to deploy and additional time to boot the system.

BRIEF SUMMARY OF THE INVENTION

Accordingly, approaches are needed to permit the continued use of ATMs with minimal downtime.

Embodiments described herein an ATM that includes redundant hardware sets within the ATM enclosure. In some embodiments, the ATM includes two central processing unit (CPU) cores.

In some embodiments, the dual-core ATM system has two physical central processing units ("computing devices" or "cores") that are configured to perform operations affecting peripheral devices. Peripheral devices of the dual-core ATM system can include a peripheral screen, such as a touch screen, a card reader, a PIN pad (e.g., an encrypted pin pad or "EPP"), a cash dispenser, and a cash deposit module.

In some embodiments, one of the computing devices controls the peripheral devices while the other of the computing devices provides a stable and redundant architecture in an exigency. Aspects include a peripheral system including a peripheral switch that can isolate one of the computing devices from the one or more peripheral devices and that can permit the other of the computing devices to control the one or more peripheral devices.

By maintaining redundant hardware sets within the ATM enclosure, the system can avoid a necessary reboot or powering-off in the event of, for example, a software failure. Instead, the dual-core ATM system is configured to efficiently switch peripherals devices to an already-booted and core that awaits control. As a result, ATM users could encounter minimal downtime, while details of the failure state could be more fully captured and reported, as the failing system could perform diagnostic functions without needing to default to resuming operation.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION OF THE INVENTION

Provided herein are system, apparatus, device, method and/or computer program product embodiments, and/or combinations and sub-combinations thereof, for conducting ATM transactions. Many banks presently offer a mobile app experience that allows account holders to conduct a variety of transactions. For example, an account holder may use the mobile app to transfer funds from a savings account to a checking account, or pay bills from their funds.

Despite this flexibility, some transactions must still be conducted through an ATM (or through in-person banking with a human teller). In particular, cash withdrawals require physical access to the money, so interacting with a teller (human or ATM) is typically part of the process. Disclosures herein provide a dual-core ATM system for maintaining reliable ATM operations with minimal system downtime.

Figure 1A:
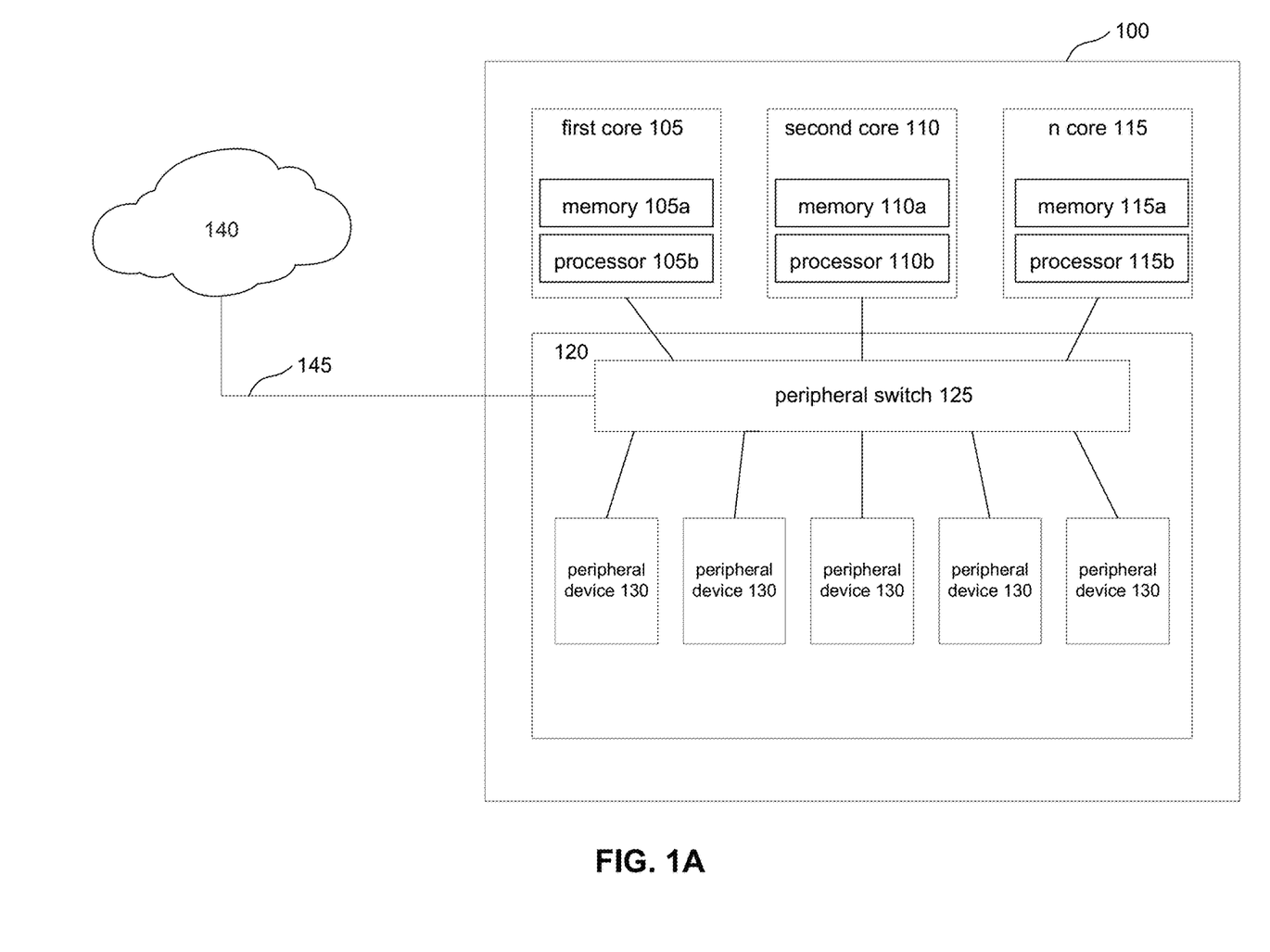
FIGS. 1A and 1B illustrates a dual-processor ATM system, in accordance with an embodiment.

FIG. 1A illustrates a dual-processor ATM system 100, in accordance with an embodiment. Dual-core ATM system 100 includes a one or more computing devices, specifically, first core 105, a second core 110, n core 115. Dual-core ATM system 100 further includes peripheral system 120.

First core 105 is a processor core (i.e., "core") that functions as a processing unit of a CPU. First core 105 includes a memory 105a and a processor 105b. Memory 105a may include one or more storage devices configured to store instructions executable by processor 105b to perform operations associated with the disclosed embodiments.

Second core 110 is a core that functions as a processing unit of a CPU. Second core 110 can be a separate core, but redundant with respect to first core 105. Second core 110 includes a memory 110a and a processor 110b. Memory 110a may include one or more storage devices configured to store instructions executable by processor 110b to perform operations associated with the disclosed embodiments. Like memory 105a of first core 105, memory 110a can include one or more programs that perform the functions of one or more peripheral systems 120.

In some embodiments, dual-core ATM system 100 can include additional processing cores. Specifically, dual-core ATM system 100 can include n cores 115. In some embodiments n cores 115 can, like second core 110, be a separate but redundant core with respect to first core 105. In some embodiments, n cores 115 can be configured non-redundant and provided to perform separate operations of dual-core ATM system 100. N core 115 includes memory 115a that can include one or more storage devices configured to store instructions executable by processor 115b to perform operations associated with peripheral systems 120.

The disclosed embodiments are not limited to separate programs or computers configured to perform dedicated tasks. For example, memory 105a may include a program that performs the functions of one or more peripheral systems, or multiple such programs. Additionally, processor 105b may execute one or more programs located remotely from dual-core ATM system 100. For example, remote system 145 may, via computing system dual ATM system 100, access one or more remote programs that, when executed, perform functions related to peripheral system 120. In some embodiments, the program may be stored in an external storage device, such as a cloud server located outside of dual-core ATM system 100, and processor 105b may execute the program remotely.

The disclosed embodiments are not limited to separate programs or computers configured to perform dedicated tasks. In some embodiments, first core 105, second core 110 and n cores 115 can also execute one or more programs located remotely from dual-core ATM system 100. In some embodiments, the program can be stored in an external storage device, such as a cloud server located outside of dual-core ATM system 100, and processors 105b, 110b, and/or 115b can execute the program remotely.

In some embodiments, peripheral system 120 can include one or more peripheral switches 125 and peripheral devices 130, 132, 134, 136 and 138 that are capable of performing or supporting various types of financial transactions, such as a cash withdrawal, a money deposit (e.g., a check or cash deposit), a money transfer (e.g., a transfer from one bank account to another bank account), access to information related to an account (e.g., a bank account, a checking account, a credit card account, etc.), and/or the like.

In some embodiments, peripheral switch 125 is a device or module that connects source devices or modules of dual-core ATM system 100 to receive and forward data to destination devices or modules. Peripheral switch 125 can connect one or more of first core 105, second core 110, n core 115, to one or more peripheral devices 130, and remote connection 145 to perform communications. In some embodiments, network topologies to interconnect cores can include bus, ring, two-dimensional mesh, crossbar, etc.

In one embodiment, at least first core 105 and second core 110 are configured to handle operations to be performed by dual-core ATM system 100, where only one of the cores is utilized at a time to perform of such operations. In this example, the other of the first core 105 and second core 110 serves as a redundant core in the case the core currently performing operations requires a procedure that disables operability. For example, if one core requires repair, upgrading or is otherwise offline, the other core can continue execution of operations to be performed by dual-core ATM system 100.

For example, first core 105 and second core 110 can be configured to handle operations to be executed by dual-core ATM system 100, where the actual operations are executed by first core 105. In some embodiments, if the first core 105 requires a repair (e.g., upgrade, or the like), first core 105 can be disabled during the repair while the second core 110 continues running the ATM operations. In some embodiment, dual-core ATM system 100 permits this with minimal or no service disruption of the ATM, such that a technician is able to physically remove and replace (i.e., swap) the device.

In some embodiments, an automated trigger or a remote trigger, such as remote system 140, switches operational control between cores due to a software deployment, a failure, or the like, during the course of normal operations. In such case, remote system 140 can communicate with dual-core ATM system 100 by remote connection 145, to perform a "rollover" or "switch" operation to manage deployment and core downtime. In some embodiments, the swap or switch can occur within a limited time frame, such as one hour, in which case the one core of first core 105 and second core 110 is again available to resume operations. In some embodiments, first core 105 and second core 110 can both receive power while the rollover or switch operation is performed.

As an example, in the case of a software deployment to one of first core 105 and second core 110, a stable version of the ATM operating system can be maintained for the other of first core 105 or second core 110. After the deployment, ATM operations can be resumed by the one of the first core 105 or second core 110, which then operates under the newly deployed software. Then, if a software fault occurs with the newly deployed software, the dual-core ATM system can be switched back to the stable version maintained on the other of the first core 105 and second core 110. Thus, operations can be maintained with minimal downtime.

In some embodiments, first core 105, second core 110 and n core 115 can be coupled tightly or loosely. For example, cores may or may not share caches, and they may implement message passing or shared-memory inter-core communication methods. Cores 105, 110 and 115 can be identical cores or can be differently configured.

In some embodiments, dual-core ATM system 100 can receive an instruction to enable one or the other of first core 105 and second core 110. In some embodiments, dual-core ATM system can include a switch (physical or logical) that contains the instruction of which core to enable. As an example, a technician service dual-core ATM system 100 can toggle a physical switch to activate one or the other of first core 105 and second core 110 to perform ATM operations before performing maintenance on the dual-core ATM system 100.

In some embodiments, the switch function can be automated or performed remotely, such as by a pre-set trigger or by remote system 140. As an example, dual-core ATM system 100 can be configured to detect a fault (such as a software or hardware fault) occurring in one of first core 105 and second core 110. This detection can function as a trigger to activate the other of first core 105 and second core 110 to take over operations.

In some embodiments, dual-core ATM system 100 handles substantial communication via peripheral switch 125. Such communication can include signal transmissions between peripheral devices 130 to 138, first core 105, second core 110 and n core 115. In some embodiments, peripheral switch 125 can be configured to monitor operations and detect faults, or coupled to one or more modules to perform such functions. In such case, peripheral switch 125 can trigger the other of first core 105 and second core 110 to perform operations.

In some embodiments, an external system or human can monitor the operation of the dual-core ATM system 100 remotely and intervene, for example, by setting a flag or running a script, to cause the other of first core 105 and second core 110 to handle ATM operations Thus, when one of the cores is offline, the other is capable and enabled to handle all ATM operations, without powering-down or rebooting the dual-core ATM system 100. In some embodiments, first core 105 and second core 110 can be configured to communicate and perform synchronization as to which core is in charge and which provides redundancy. For example, synchronization can be provided through mailbox, semaphores, or the like to indicate the core that is in charge.

In some embodiments, by a mailbox process, a bin contains data that indicates the core (i.e., first core 105 or second core 110) that is in charge. Each core may include a function to read the mailbox data to determine which is to handle ATM operations. In some embodiments, by a semaphore process, one individual signal (e.g., by a wire or bus) can go back and forth between machines. For example, one core can assert that wire (e.g., pull it high, pull low, etc.) to set the semaphore and claim control of ATM operations. In this example, if the other core tries to assert that semaphore, it cannot do so while the one core continues to assert exclusivity. Such a function can provide unambiguous clarity as to which core is in control of ATM operations.

Figure 1B:
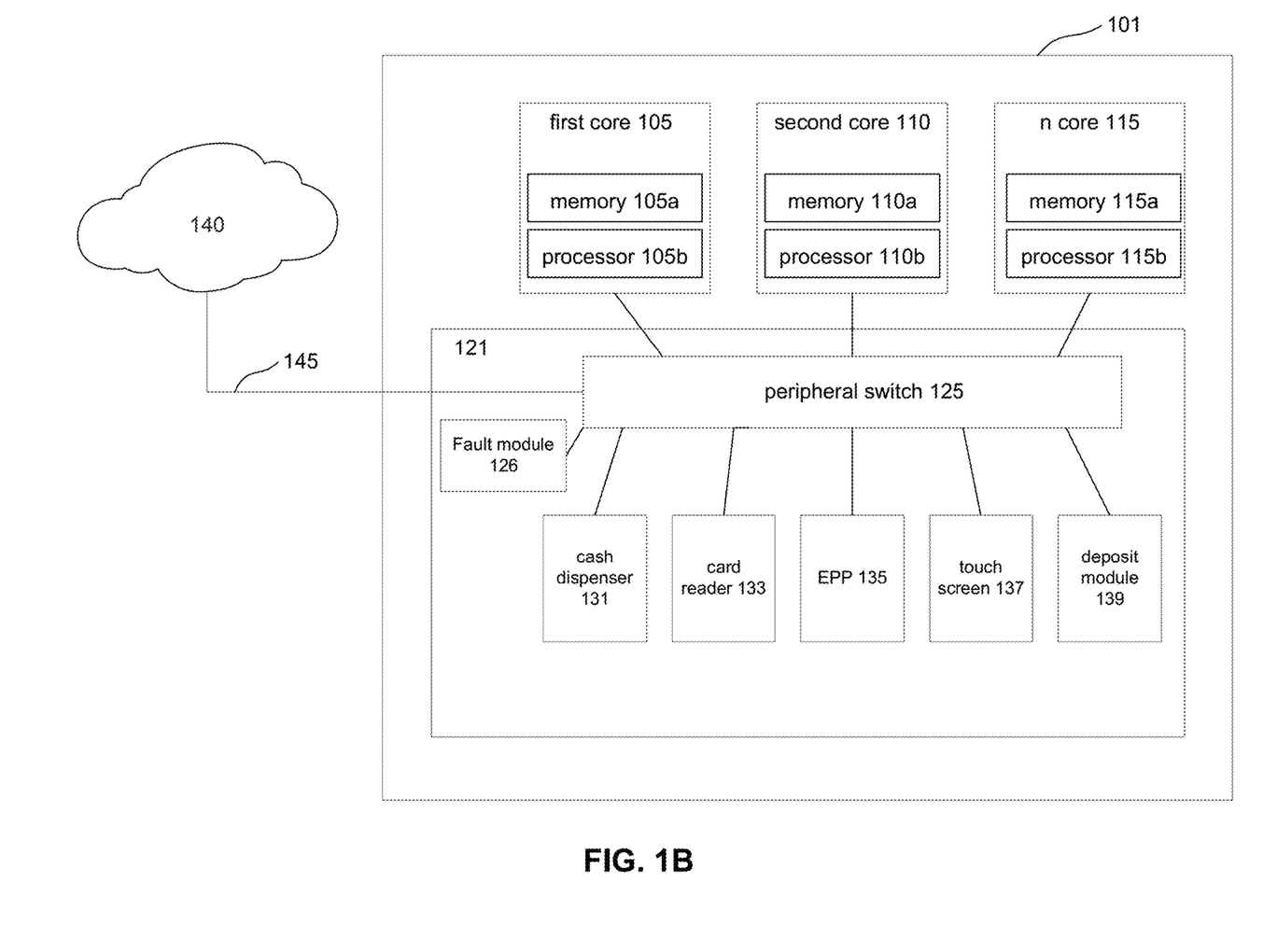

FIG. 1B illustrates an exemplary dual-core ATM system 101, in accordance with an embodiment. Elements in FIG. 1B with the same annotations as elements in FIG. 1A are described above. Dual-core ATM system 101, which is an another embodiment of dual-core ATM system 100 described above, includes peripheral system 121 that includes peripheral devices 131 to 139 and fault module 126.

In some embodiments, fault module 126 can provide a function (i.e., a switch function) to permit one or the other of first core 105 and second core 110 to control ATM operations. The switch function can be performed remotely based on a signal received from remote connection 145. Alternatively, the switch function can be performed based on an automated process, such as by a pre-set trigger or by. As an example, dual-core ATM system 100 can be configured to detect a fault (such as a software or hardware fault) occurring in one of first core 105 and second core 110. This detection can function as a trigger to activate the other of first core 105 and second core 110 to take over operations. The fault module 126 can be coupled to peripheral switch 125 to monitor operations and detect faults. In such case, the fault module 126 can trigger the other of first core 105 and second core 110 to perform operations. In some embodiments, an external system or human can monitor the operation of the dual-core ATM system 101 remotely and intervene, for example, by setting a flag or running a script, to cause the other of first core 105 and second core 110 to handle ATM operations In some embodiments, peripheral devices can include, for example, a cash dispenser module 131, a card reader 133, an encrypting pin pad (EPP) 135, a touch screen 137, a deposit module 139, and the like. In some embodiments, peripheral system 121 can include fewer or greater peripheral devices. As an example, peripheral devices can include cash dispenser module 131 to provide cash to a user in accordance with an electronic financial transaction. In a case where a user selects an ATM transaction to withdraw cash, first core 105 of dual-core ATM system 100 or 101 can dispense the appropriate amount of cash via peripheral device 131, and the user device may prompt the user to obtain the cash from the ATM device. In some embodiments, the ATM device 100 or 101 may provide, to the user device, an instruction to prompt the user to obtain the cash from the ATM device 100 or 101. As yet another example, in a case where the user's selected ATM transaction is to check balance information, the ATM device 100 or 101 may provide, to the user device, information regarding a balance of the user's account, which the user device may display to the user.

Figure 2:
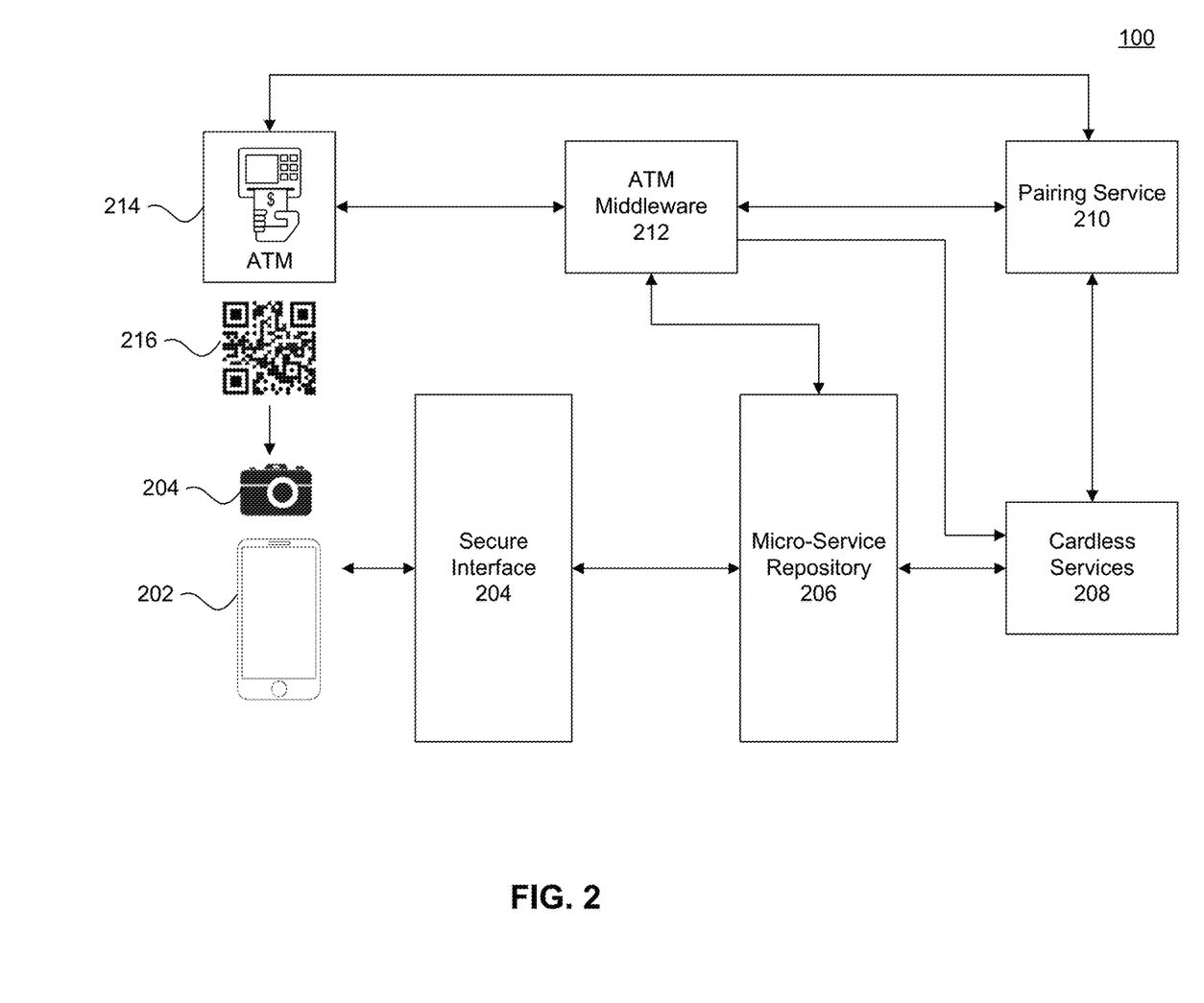
FIG. 2 illustrates a cardless ATM system, in accordance with an embodiment.

FIG. 2 illustrates a cardless ATM system 200, in accordance with an embodiment. In an embodiment, mobile device 202 is used by an account holder of a banking institution to conduct online banking. Specifically, mobile device 202 will typically have a mobile application ("app") installed thereon and usable for interacting with the banking institution for performing banking transactions on a user account holder's accounts.

In some embodiments, mobile device 202 interacts with the banking institution through a secure interface 204. Secure interface 204 can provide facilities for securely communicating with the banking institution's backend systems to conduct transactions, and also protects the banking institution's backend systems from improper access attempts (e.g., distributed denial of service (DDoS) attacks, injection attacks, etc.)

In an embodiment, interaction with the banking institution's backend systems through secure interface 204 is accomplished through a variety of micro-services provided by micro-service repository 206. For example, cardless services 208 allow mobile device 202 to interact with an ATM 214 without the need to have a physical ATM card as an authentication mechanism for the account holder.

Specifically, cardless services 208 can allow the user account holder to authenticate themselves to the banking institution using authentication procedures within an app installed on mobile device 202. By way of non-limiting example, this may include a username and password based login, biometric recognition, access key, and other authentication mechanisms, including the use of multiple authentication mechanisms in a multi-factor authentication scheme. A skilled artisan will appreciate that a variety of authentication mechanisms may be employed at mobile device 202 in order to ensure that the user is authorized to access their specific account through cardless services 208.

In an embodiment, an authenticated user on mobile device 202 may request a transaction through cardless services 208 that needs to be serviced through ATM 214 (such as a cash withdrawal). Since the authenticated user is known to the banking institution as having proper access to perform the transaction, even without the use of an ATM card, cardless services 208 can inform ATM 214 that the authenticated user is permitted to complete the transaction at ATM 214.

In order to complete the transaction, cardless services 208 can pair the transaction to ATM 214 to allow completion of the transaction at ATM 214. And if, with pairing complete through pairing service 210, cardless services 208 issues a request for ATM 214 to perform a specific transaction (e.g., providing cash to complete a cash withdrawal transaction), the instructions can be provided through ATM middleware 212 to direct the behavior of ATM 214.

In accordance with an embodiment, pairing service 210 handles pairing of transactions from mobile device 202 with ATM 214 through the use of a barcode or other unique identifying information obtained from ATM 214 and provided through mobile device 202 as confirmation. For example, ATM 214 may display a barcode, such as QR code 216, on its screen. This barcode includes an identifier associated with ATM 214. When mobile device 202 has prepared a transaction for performance through cardless services 208, the mobile app executing on mobile device 202 may instruct the authenticated user to visit ATM 214 to complete the transaction. A skilled artisan will recognize that, although the disclosure herein is presented principally by way of barcodes (which include special cases of barcodes, such as QR codes), other forms of coding may be used in place of barcodes to equivalent effect.

In this embodiment, upon arriving at ATM 214, the user of mobile device 202 is presented with QR code 216 on the display screen of ATM 214. The mobile app executing on mobile device 202 may present the user with an option for obtaining this QR code 216 (or other code) from the ATM 214. For example, the mobile app may access a camera feature to allow the user to scan QR code 216 using a camera 203 built into mobile device 202. The mobile device 202 sends this QR code to cardless services 208 and on to pairing service 210, which recognizes the identifier for ATM 214 in scanned QR code 216. Accordingly, pairing service 210 is able to pair the transaction initiated from mobile device 202 with ATM 214 specifically on the basis of the identifier.

In a further embodiment, QR code 216 (or other form of barcode) may be read by a barcode reader 218. Barcodes, such as QR codes, that are formed in accordance with a specific standard are commonly readable by any reader that itself conforms to the barcode standards. For example, if barcode reader 218 is capable of reading QR codes such as QR code 216, then barcode reader 218 would be able to obtain raw data present in any such QR code. Accordingly, a skilled artisan would understand that barcode reader 218 is any form of device capable of reading a barcode (such as QR code 216) displayed on ATM 214, and may include devices such as a handheld barcode scan tool or a mobile phone with an installed application capable of reading and processing the barcode.

Figure 3A:
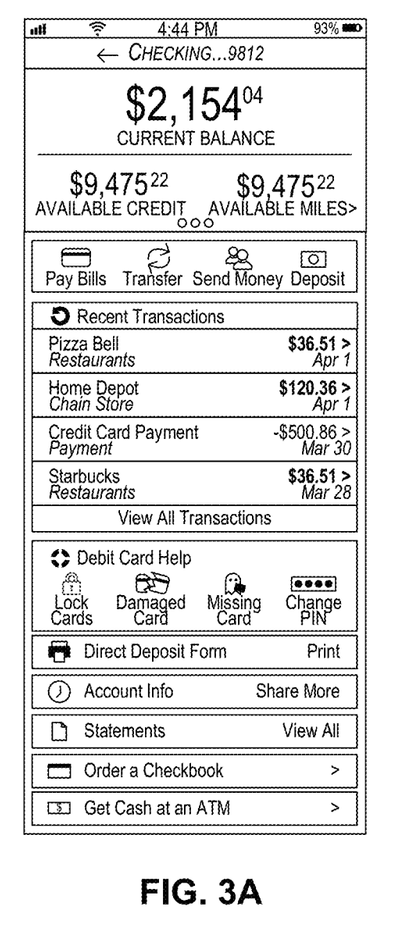
FIGS. 3A through 3H illustrate a wireframe of a mobile device ATM fulfillment process, in accordance with an embodiment.
Figure 3B:
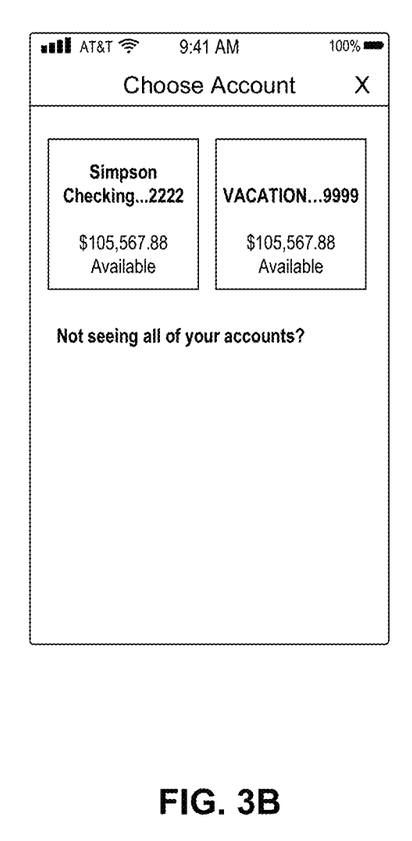
Figure 3C:
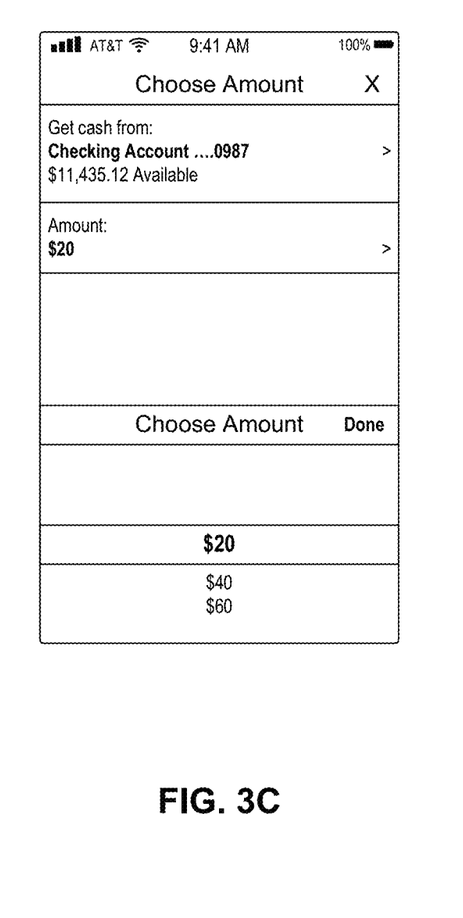
Figure 3D:
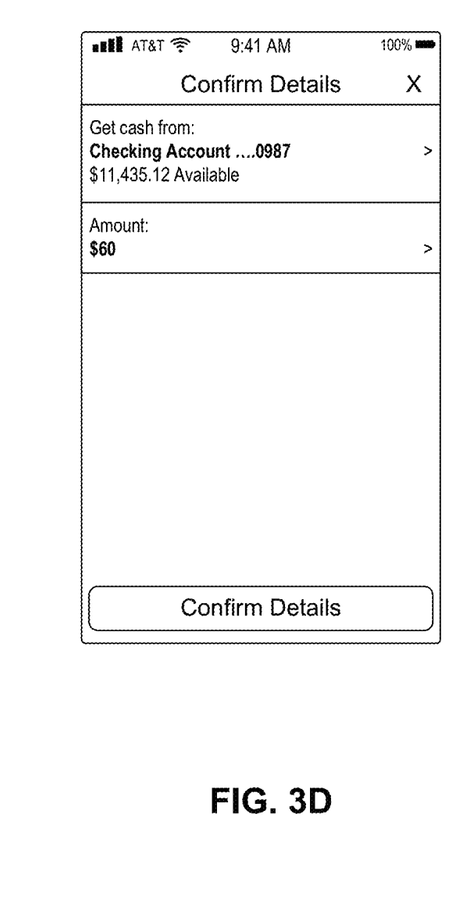

FIGS. 3A through 3H illustrate a wireframe of a mobile device ATM fulfillment process, in accordance with an embodiment. FIG. 3A shows an exemplary home screen for a mobile app used for banking on a mobile device, such as mobile device 202 of FIG. 2. From this screen, a user of the mobile app may select a transaction that requires an ATM for fulfillment—in this case, "Get Cash at an ATM." FIG. 3B shows an exemplary screen allowing the user to select an account from which to perform the ATM withdrawal. FIG. 3C shows an exemplary screen for selecting an amount for the ATM cash withdrawal, while FIG. 3D shows an exemplary screen for confirming details of the withdrawal (including the account and the amount selected).

Figure 3E:
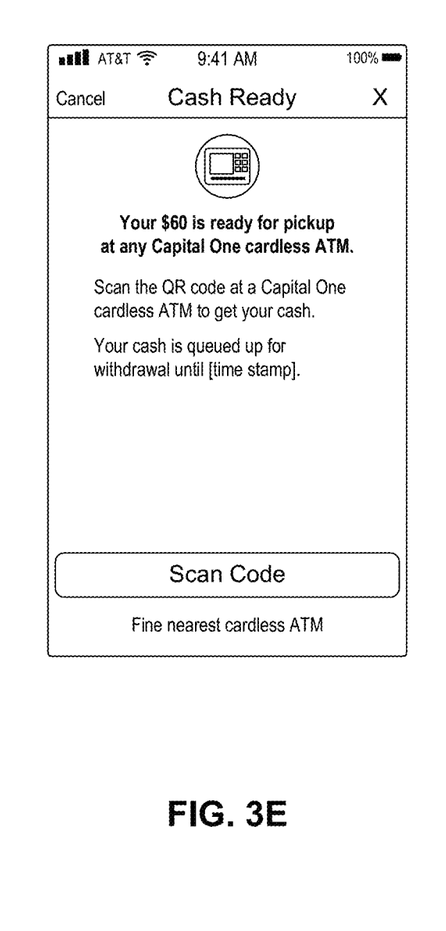
Figure 3F:
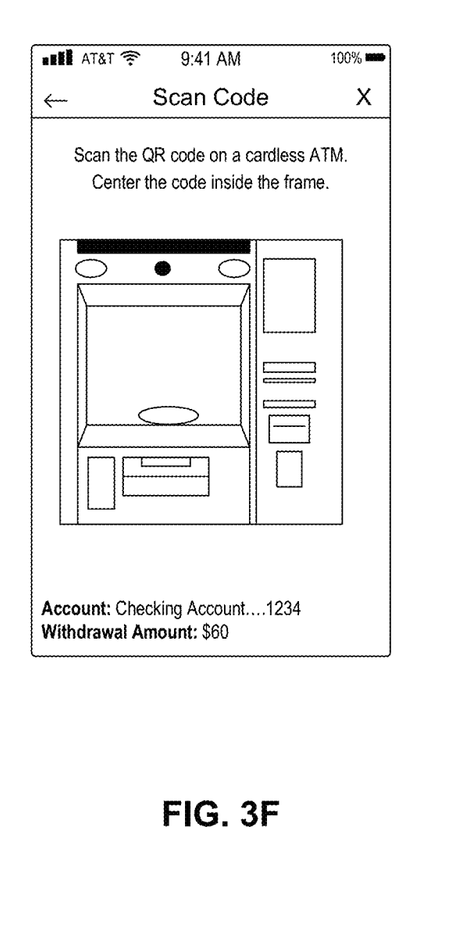
Figure 3G:
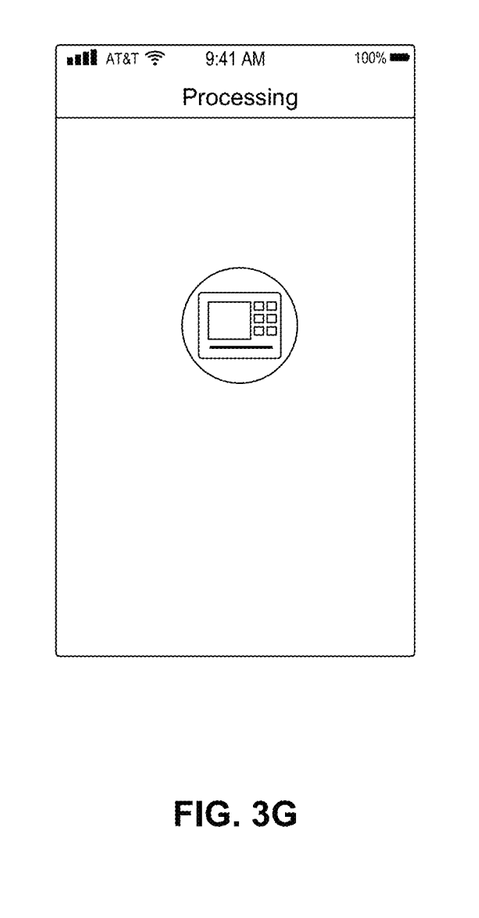
Figure 3H:
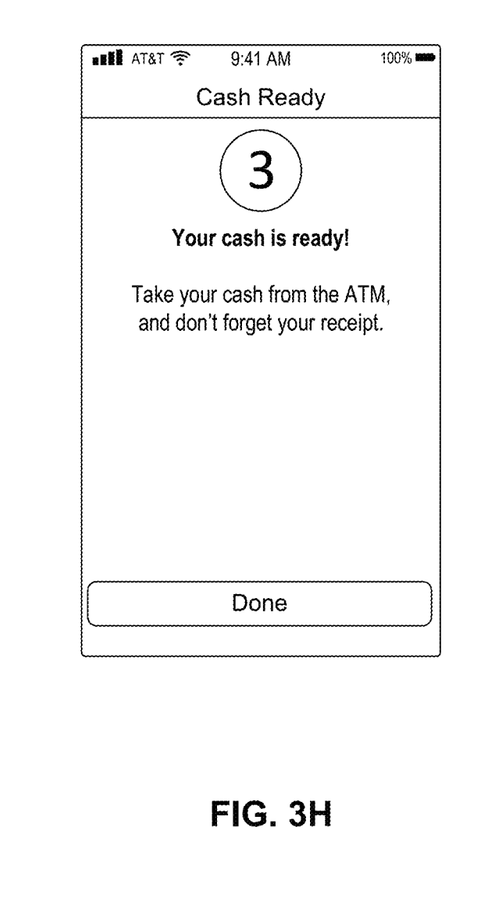

FIG. 3E shows an exemplary screen notifying the user that the transaction has been approved, and is ready to be completed at an ATM. This screen also provides an option allowing the user to scan a code, which, once selected, navigates to the exemplary screen of FIG. 3F. The exemplary screen of FIG. 3F shows a camera feature allowing the user to approach the ATM with their mobile device to scan the code (e.g., a QR code) shown on the ATM display. And the exemplary screen of FIG. 3H shows a confirmation screen indicating that the transaction has been completed by the ATM.

As discussed in the context of FIG. 2, in an embodiment pairing service 210 uses an identifier for ATM 214 obtained by mobile device 202 (e.g., by scanning QR code 216 with an embedded identifier, using camera 203 of mobile device 102) to pair ATM 214 with the transaction provided by mobile device 202. In this embodiment, the exemplary screens of FIGS. 3A-3E illustrate the process of preparing the transaction for fulfillment by ATM 214, and FIGS. 3F-3H illustrate the process of pairing the specific ATM 214 to the transaction of mobile device 202 by scanning QR code 216 using camera 203 of mobile device 202.

Figure 4:
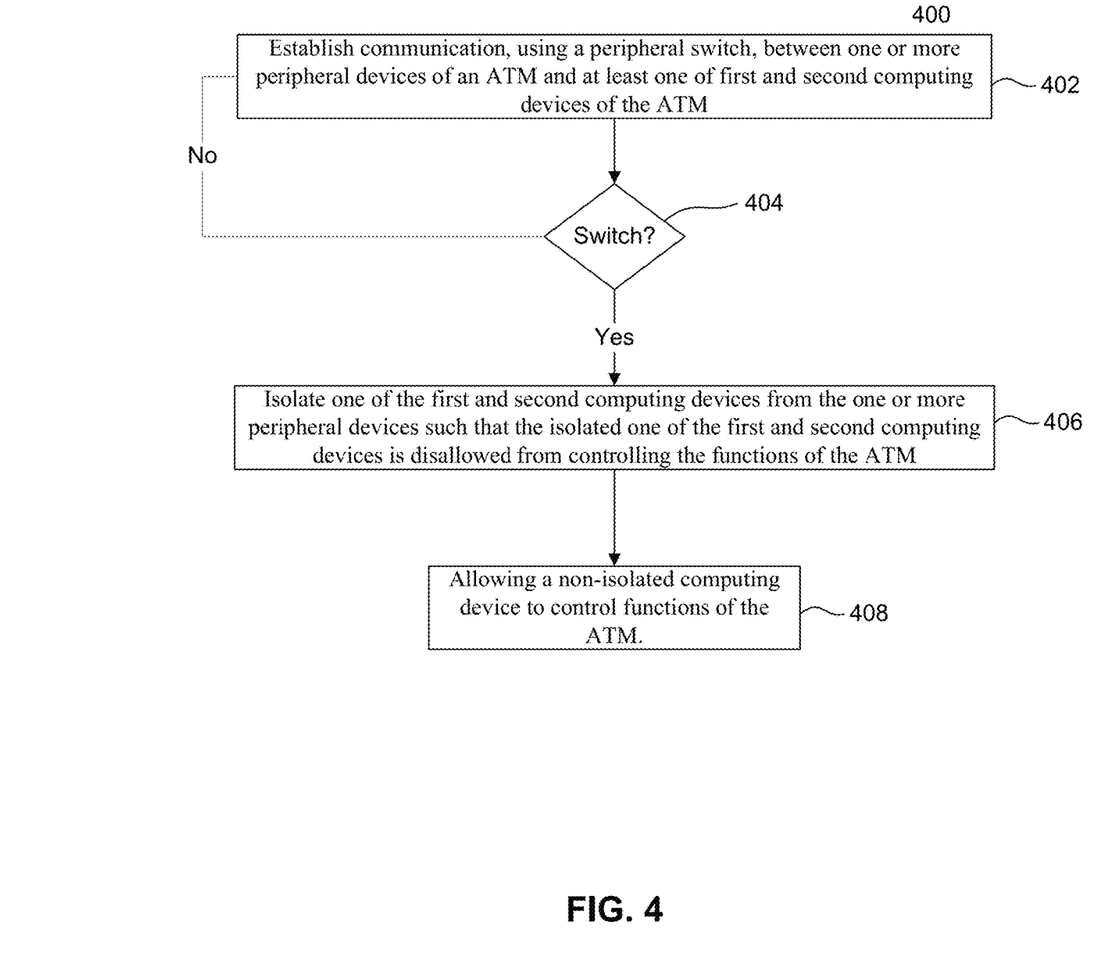
FIG. 4 is a flowchart illustrating steps by which control of an ATM is conducted, in accordance with an embodiment.

FIG. 4 is a flowchart 400 illustrating steps of a dual-core ATM control method, by which an ATM system establishes control by one or an other of one or more computing devices, in accordance with an embodiment. The one or more computing devices may refer to one or more of core 105, 110 or 115. It is to be appreciated the process may not execute all steps shown or in the order shown, and may execute additional steps.

In an embodiment, at step 402 a peripheral switch establishes a channel of communication between one or more peripheral devices of the dual-core ATM system 100 or 101 and at least one of first and second computing devices of the ATM. First and second computing devices can be an embodiment of cores 105 and 110. The peripheral switch can be an embodiment of peripheral switch 125. The one or more peripheral devices can be an embodiment of one or more peripheral devices 130, such as cash dispenser module 131, card reader 133, encrypting pin pad (EPP) 135, touch screen 137, deposit module 139, and the like.

At step 404, the peripheral switch can be used to isolate one of the first and second computing devices from the one or more peripheral devices such that the isolated one of the first and second computing devices is disallowed from controlling the functions of the ATM. For example, the peripheral switch can isolate the one of the first and second computing devices (e.g., core 105) from the one or more peripheral devices in response to a fault detection, or a signal received by remote connection, or the like.

At step 406, the peripheral switch permits a non-isolated computing device to control functions of the ATM. The non-isolated computing device can be the other of the first and second computing devices (e.g., second core 110).

In accordance with an embodiment, a computing device identifier maintained with no ambiguity such that ATM operations can only be controlled by one of the first or second computing devices at a time. That is, only one core is enabled to dispense cash or conduct a transaction at a given moment. However, the other core can be configured to monitor the status of the one core. As an example, if a first computing device is enabled to conduct ATM operations, the second computing device can be in a state of monitoring such operations. Then if a fault or software deployment, or other event occurs, the second computing device can provide substantially complete or detailed logs about that event. In some embodiments, the first computing device could run a diagnostic operation to obtain complete details about the event without requiring resumption of ATM operations. Thus, the second computing device can record and respond to information about the event. Subsequently, ATM operations can be reset to be performed by the second computing device, with minimal downtime.

In some embodiments, in the event of a software fault due to a recent deployment, a stable operating system can be maintained by the second computing device. Then, as the software fault occurs, the second computing device can be permitted control to ensure reliability of service and minimal downtime permits. ATM users are provided full service from the ATM even if it runs an older but stable version. In some embodiments, if both computing devices have the capacity to support multiple operating system versions, such that either operating system can be executed on either computing device.

Figure 5:
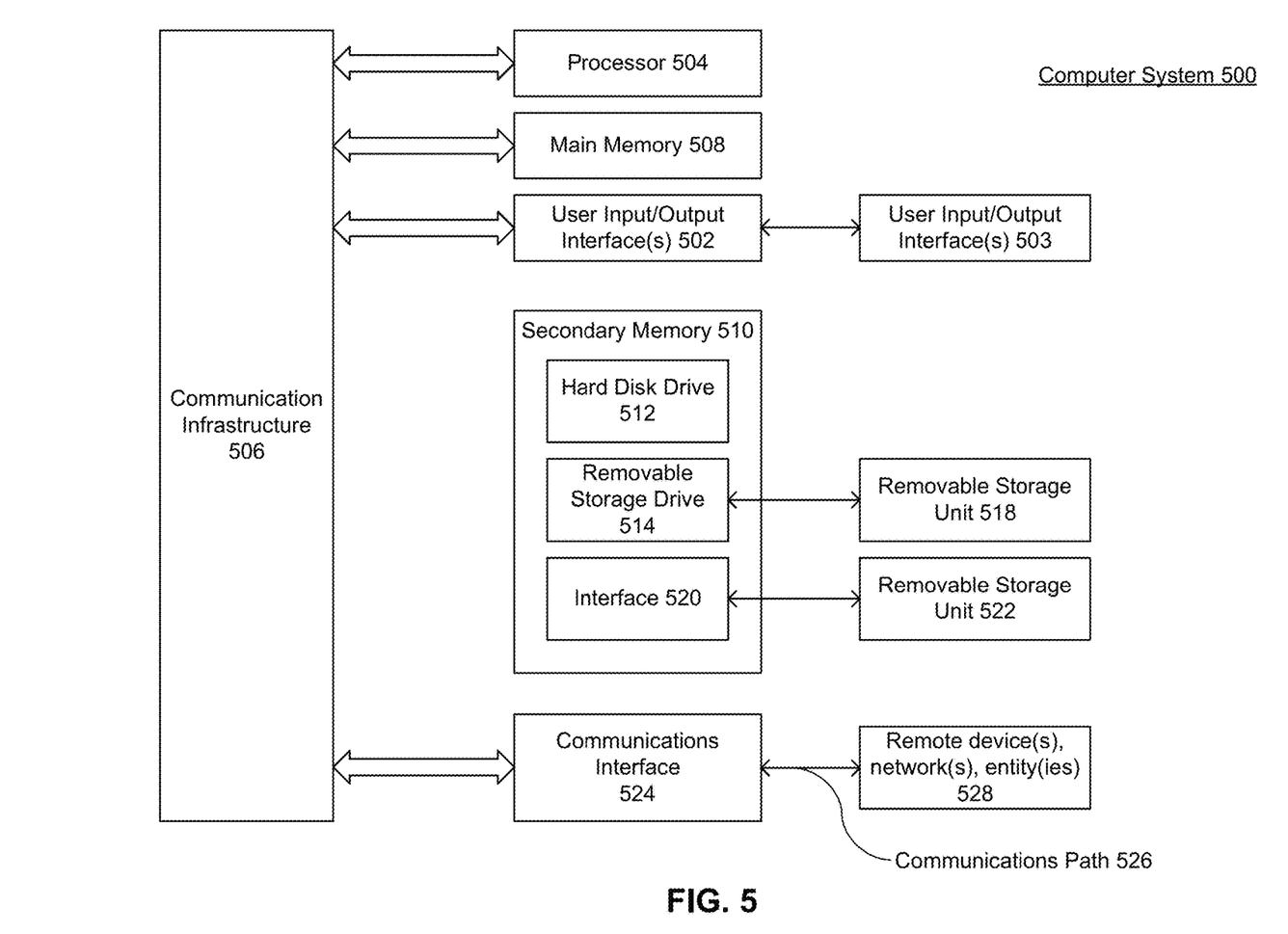
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. In some embodiments, processor 504 many include more than one core, e.g., cores 105, 110, 115, etc. For ease of description only, all scenarios will be discussed as processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A computer implemented method, comprising: establishing communication, using a peripheral switch, between one or more peripheral devices of an Automated Teller Machine (ATM) and at least one of first and second computing devices of the ATM;
   isolating, using the peripheral switch, the second computing device from the one or more peripheral devices in a first operation mode such that the isolated second computing device is disallowed from controlling functions of the one or more peripheral devices of the ATM;
   enabling, using the peripheral switch, the first computing device to control the functions of the one or more peripheral devices of the ATM in the first operation mode;
   isolating, using the peripheral switch, the first computing device from the one or more peripheral devices in a second operation mode such that the isolated first computing device is disallowed from controlling the functions of the one or more peripheral devices of the ATM;
   enabling, using the peripheral switch, the second computing device to control the functions of the one or more peripheral devices of the ATM in the second operation mode, wherein the first and second computing devices are configured to redundantly control the functions; and
   in response to an event of software fault comprising instability and/or unresponsiveness of either of the first or second computing device occurring, transitioning, using the peripheral switch, from the first operation mode to the second operation mode, so that the functions of the one or more peripheral devices of the ATM are controlled by only one of the first computing device or the second computing device at a time.

2. A system, comprising:
   a first computing device comprising:
   a memory configured to store first operations for controlling functions of an Automated Teller Machine (ATM); and
   a processor configured to perform the first operations;
   a second computing device comprising:
   a memory configured to store second operations for controlling the functions; and
   a processor configured to perform the second operations; and
   a peripheral system comprising:
   one or more peripheral devices of the ATM; and
   a peripheral switch configured to facilitate communication between the one or more peripheral devices and at least one of the first and second computing devices, wherein:
   in a first operation mode, the peripheral switch is configured to enable the first computing device to control the functions and to isolate the second computing device from each of the one or more peripheral devices, and the second computing device does not control the functions of the one or more peripheral devices of the ATM,
   in a second operation mode, the peripheral switch is configured to isolate the first computing device from each of the one or more peripheral devices and to enable the second computing device to control the functions, and the first computing device does not control the functions of the one or more peripheral devices of the ATM, and
   in response to an event of software fault comprising instability and/or unresponsiveness of either of the first or second computing devices occurrring, the peripheral switch is configured to transition from the first operation mode to the second operation mode, so that the functions of the one or more peripheral devices of the ATM are controlled by only one of the first computing device or the second computing device at a time.

3. The system of claim 2, further comprising:
   a remote connection device in communication with the peripheral switch; and
   wherein the peripheral switch is further configured to facilitate communication between the remote connection device and at least one of the first and second computing devices.

4. The system of claim 3, wherein:
   the remote connection device comprises a user device.

5. The system of claim 2, wherein:
   the peripheral switch is further configured to receive an instability signal from at least one of the first and second computing devices and to perform the isolation based on the instability signal.

6. The system of claim 2, wherein:
   the peripheral switch is further configured to perform the isolation based on an unresponsiveness of at least one of the first and second computing devices.

7. The system of claim 2, wherein:
   an isolated one of the first and second computing devices is configured to perform self-diagnosis, a restart, or the self-diagnosis and the restart; and
   a non-isolated one of the first and second computing devices is configured to control the functions.

8. The system of claim 2, wherein:
   an isolated one of the first and second computing devices is configured to perform a software version upgrade or a rollback operation, and a non-isolated one of the first and second computing devices is configured to control the functions.

9. The system of claim 2, wherein:
the first operations correspond to a first software version;
the second operations correspond to a second software version; and
the first software version is different from the second software version.

10. The system of claim 2, wherein the peripheral switch is further configured to enable a non-isolated computing device to control the functions and an isolated computing device to be disconnected.

11. The system of claim 2, further comprising one or more additional computing devices, each of the one or more additional computing devices respectively comprising:
a memory configured to store operations for controlling the functions; and
a processor configured to perform the operations,
wherein the peripheral switch is further configured to facilitate communications between the one or more peripheral devices and at least one of the first, second, and one or more additional computing devices.

12. The system of claim 2, wherein the first and second computing devices are configured to periodically communicate with the peripheral switch to ascertain which of the first and second computing devices is designated as primary controller of the functions.

13. The system of claim 2, wherein:
one of the first and second computing devices is configured to initially control the functions;
another one of the first and second computing devices is configured to shadow the operations performed by the one of the first and second computing devices; and
the peripheral switch is further configured to transfer control of the functions to the another one of the first and second computing devices such that a financial transaction being performed by the ATM may be seamlessly continued with the another one of the first and second computing devices controlling the functions.

14. The system of claim 2, wherein:
the ATM is configured to perform a financial transaction comprising a first group of operations and a second group of operations; and
the first group of operations is performed by the first computing device and the second group of operations is performed by the second computing device.

15. A non-transitory computer readable medium having instructions stored thereon, that, when executed on an Automated Teller Machine (ATM), cause the ATM to perform operations, the operations comprising:
establishing communication, using a peripheral switch, between one or more peripheral devices of the ATM and at least one of first and second computing devices of the ATM;
isolating, using the peripheral switch, one of the first and second computing devices from the one or more peripheral devices such that the isolated one of the first and second computing devices is disallowed from controlling functions of the ATM; and
enabling, using the peripheral switch, a non-isolated computing device to control the functions of the ATM,
wherein in a first operation mode, the peripheral switch is configured to enable the first computing device to control the functions and to isolate the second computing device from each of the one or more peripheral devices, and the second computing device does not control the functions of the one or more peripheral devices of the ATM,
wherein in a second operation mode, the peripheral switch is configured to isolate the first computing device from each of the one or more peripheral devices and to enable the second computing device to control the functions, and the first computing device does not control the functions of the one or more peripheral devices of the ATM, and
in response to an event of software fault comprising instability and/or unresponsiveness of either of the first or second computing device occurring, the peripheral switch is configured to transition from the first operation mode to the second operation mode, so that the functions of the one or more peripheral devices of the ATM are controlled by only one of the first computing device or the second computing device at a time.

16. The non-transitory computer readable medium according to claim 15, wherein the operations further comprise:
an isolated one of the first and second computing devices performing self-diagnosis, a restart, or the self-diagnosis and the restart; and
a non-isolated one of the first and second computing devices controlling the functions.

17. The non-transitory computer readable medium according to claim 15, wherein the operations further comprise:
an isolated one of the first and second computing devices performing a software version upgrade or rollback; and
a non-isolated one of the first and second computing devices controlling the functions.

18. The non-transitory computer readable medium according to claim 15, wherein the operations further comprise:
the peripheral switch enabling a non-isolated computing device to control the functions; and
disconnecting an isolated computing device physically.

* * * * *